US012148371B2

(12) United States Patent
Sun

(10) Patent No.: US 12,148,371 B2
(45) Date of Patent: Nov. 19, 2024

(54) LIGHT-EMITTING DRIVING CIRCUIT, BACKLIGHT MODULE AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Bo Sun, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,119

(22) PCT Filed: Dec. 16, 2021

(86) PCT No.: PCT/CN2021/138876

§ 371 (c)(1),
(2) Date: Dec. 27, 2021

(87) PCT Pub. No.: WO2023/103015

PCT Pub. Date: Jun. 15, 2023

(65) Prior Publication Data

US 2024/0046863 A1 Feb. 8, 2024

(30) Foreign Application Priority Data

Dec. 9, 2021 (CN) ......................... 202111497201.3

(51) Int. Cl.
*G09G 3/3233* (2016.01)
*G09G 3/34* (2006.01)

(52) U.S. Cl.
CPC ......... *G09G 3/3233* (2013.01); *G09G 3/3406* (2013.01); *G09G 2300/0819* (2013.01);
(Continued)

(58) Field of Classification Search
CPC ........... H10K 59/00–95; G09G 3/3233; G09G 3/3406; G09G 2300/0819;
(Continued)

(56) References Cited

U.S. PATENT DOCUMENTS

2009/0184902 A1 7/2009 Tomida et al.
2016/0125803 A1* 5/2016 Qing .................... G09G 3/3233 345/209

(Continued)

FOREIGN PATENT DOCUMENTS

CN 103366682 A 10/2013
CN 103383836 A 11/2013

(Continued)

OTHER PUBLICATIONS

International Search Report in International application No. PCT/CN2021/138876, mailed on Aug. 25, 2022.

(Continued)

*Primary Examiner* — Sanjiv D. Patel
(74) *Attorney, Agent, or Firm* — PV IP PC; Wei Te Chung

(57) ABSTRACT

The present disclosure discloses a light-emitting driving circuit, a backlight module, and a display panel. The light-emitting driving circuit includes a drive transistor, a data writing module, and a light-emitting module. In the light-emitting module, the first terminal and the second terminal of the first light-emitting device and the first terminal and the second terminal of the second light-emitting device are arranged in reverse directions. The first power signal and the second power signal are configured to perform level con- (Continued)

version according to a preset period, so that the direction of the current flowing through the drive transistor is changed according to the preset period.

20 Claims, 4 Drawing Sheets

(52) U.S. Cl.
CPC ............... *G09G 2300/0842* (2013.01); *G09G 2310/0256* (2013.01); *G09G 2310/08* (2013.01); *G09G 2320/0233* (2013.01); *G09G 2320/0295* (2013.01); *G09G 2320/045* (2013.01); *G09G 2330/02* (2013.01); *G09G 2330/10* (2013.01); *G09G 2330/12* (2013.01)

(58) Field of Classification Search
CPC ....... G09G 2300/0842; G09G 2310/08; G09G 2320/0233; G09G 2320/0295; G09G 2320/045; G09G 2330/02; G09G 2330/10; G09G 2330/12

See application file for complete search history.

(56) References Cited

U.S. PATENT DOCUMENTS

| | | | | |
|---|---|---|---|---|
| 2017/0004776 | A1* | 1/2017 | Park | G09G 3/3233 |
| 2022/0130325 | A1* | 4/2022 | Lee | H01L 33/44 |
| 2022/0262984 | A1* | 8/2022 | Choi | H01L 33/505 |

FOREIGN PATENT DOCUMENTS

| | | | |
|---|---|---|---|
| CN | 203480803 | U | 3/2014 |
| CN | 106023897 | A | 10/2016 |
| CN | 106991967 | A | 7/2017 |
| CN | 110189691 | A | 8/2019 |
| CN | 113557561 | A | 10/2021 |
| WO | 2014205888 | A1 | 12/2014 |
| WO | 2015000245 | A1 | 1/2015 |
| WO | 2020180036 | A1 | 9/2020 |

OTHER PUBLICATIONS

Written Opinion of the International Search Authority in International application No. PCT/CN2021/138876, mailed on Aug. 25, 2022.
Chinese Office Action issued in corresponding Chinese Patent Application No. 202111497201.3 dated Jun. 30, 2022, pp. 1-12.

* cited by examiner

LIGHT-EMITTING DRIVING CIRCUIT, BACKLIGHT MODULE AND DISPLAY PANEL

FIELD OF THE DISCLOSURE

This application relates to the field of display technology, in particular a light-emitting driving circuit, a backlight module, and a display panel.

BACKGROUND

Mini light-emitting diodes (Mini LEDs) and micro light-emitting diodes (Micro LEDs) are collectively referred to as MLEDs, which, as a next generation of display technology, show better display characteristics, such as high contrast, high color gamut, high response speed, viewing angle, etc. Therefore, MLEDs are widely used in the field of high-performance displays.

The driving scheme of the MLED belongs to a current driving. On the one hand, different input data signals lead to different gate-source voltages (Vgs) of the drive transistor, so that the source-drain current (Ids) and the brightness of the MLED are different, which can realize gray-scale segmentation. On the other hand, since the drive transistor is operated in on-state during the entire display time, the driving current needs to be accurately controlled to achieve the purpose of gray-scale segmentation. Therefore, threshold voltage and mobility drift of the drive transistor have direct impacts on the driving current, resulting in an abnormal display. However, in the MLED, the current direction of the drive transistor is always the same, and under the combined effects of the long turn-on time and the fixed current direction, the effect of current bias (stress) is very obvious, which likely leads to a performance drift of the drive transistor, thereby reducing the stability of the drive transistor.

SUMMARY

The present disclosure provides a light-emitting driving circuit, a backlight module, and a display panel to solve the technical problem in the prior arts that the drive transistor in the light-emitting driving circuit has an obvious current bias effect and hence the stability of the drive transistor is vulnerable.

The disclosure provides a light-emitting driving circuit. The light-emitting driving circuit includes a drive transistor, a data writing module, and a light-emitting module. A first electrode of the drive transistor is electrically connected to a first node, and a second electrode of the drive transistor is electrically connected to a first power signal. The data writing module is fed to a scan signal and a data signal, and is electrically connected to a gate of the drive transistor. The data writing module is configured to write the data signal to the gate of the drive transistor under a control of the scan signal. The light-emitting module includes at least one of the first light-emitting devices and at least one of the second light-emitting devices. A first terminal of the first light-emitting device and a second terminal of the second light-emitting device are both electrically connected to the first node. The second terminal of the first light-emitting device and the first terminal of the second light-emitting device are fed with a second power signal. The first power signal and the second power signal are configured to perform level conversion according to a preset period, so that a direction of a current flowing through the drive transistor is changed according to the preset period.

Optionally, in some embodiments of the present disclosure, the length of the preset period is at least one frame.

Optionally, in some embodiments of the present disclosure, the first power signal and the second power signal are configured to perform level conversion in a vertical blanking time between adjacent frames.

Optionally, in some embodiments of the present disclosure, the first power signal has a first high voltage level and a first low voltage level, and the first power signal is switched between the first high voltage level and the first low voltage level according to the preset period. The second power signal has a second high voltage level and a second low voltage level, and the second power signal is switched between the second high voltage level and the second low voltage level according to the preset period.

Optionally, in some embodiments of the present disclosure, the first high voltage level and the second high voltage level are the same, the first low voltage level and the second low voltage level are the same, and the first power signal and the second power signal are kept in antiphase.

Optionally, in some embodiments of the present disclosure, the data writing module includes a switch transistor and a storage capacitor.

The gate of the switch transistor is connected to the scan signal. A first electrode of the switch transistor is connected to the data signal. A second electrode of the switch transistor, one end of the storage capacitor, and the gate of the drive transistor are electrically connected. The other end of the storage capacitor is electrically connected to first electrode of the drive transistor.

Optionally, in some embodiments of the present disclosure, the light-emitting driving circuit further comprises a sensing module, the sensing module is connected to a sensing signal and a reset signal, and the sensing module is electrically connected to first electrode of the drive transistor. The sensing module is used to detect a threshold voltage of the drive transistor under the control of the sensing signal and the reset signal.

Optionally, in some embodiments of the present disclosure, the sensing module comprises a sensing transistor and a first switch unit. The gate of the sensing transistor is connected to the sensing signal. First electrode of the sensing transistor is electrically connected to one end of the first switch unit. A second electrode of the sensing transistor is electrically connected to first electrode of the drive transistor. The other end of the first switch unit is connected to the reset signal.

The present disclosure also provides a backlight module. The backlight module includes a data line configured to provide a data signal, a scan lines configured to provide a scan signal, a first power line configured to provide a first power signal, a second power line configured to provide a second power signal, and a light-emitting driving circuit.

The light-emitting driving circuit includes a drive transistor, a data writing module, and a light-emitting module. A first electrode of the drive transistor is electrically connected to a first node, and a second electrode of the drive transistor is electrically connected to a first power signal. The data writing module is fed to a scan signal and a data signal, and is electrically connected to a gate of the drive transistor. The data writing module is configured to write the data signal to the gate of the drive transistor under a control of the scan signal. The light-emitting module includes at least one of the first light-emitting devices and at least one of the second light-emitting devices. A first terminal of the first light-emitting device and a second terminal of the second light-emitting device are both electrically connected to the first node. The second terminal of the first light-emitting device and the first terminal of the second light-emitting device are fed with a second power signal. The first power signal and the second power signal are configured to perform level conversion according to a preset period, so that a direction of a current flowing through the drive transistor is changed according to the preset period.

Optionally, in some embodiments of the present disclosure, the length of the preset period is at least one frame.

Optionally, in some embodiments of the present disclosure, the first power signal and the second power signal are configured to perform level conversion in a vertical blanking time between adjacent frames.

Optionally, in some embodiments of the present disclosure, the first power signal has a first high voltage level and a first low voltage level, and the first power signal is switched between the first high voltage level and the first low voltage level according to the preset period.

The second power signal has a second high voltage level and a second low voltage level, and the second power signal is switched between the second high voltage level and the second low voltage level according to the preset period.

Optionally, in some embodiments of the present disclosure, the first high voltage level and the second high voltage level are the same, the first low voltage level and the second low voltage level are the same, and the first power signal and the second power signal are kept in antiphase.

Optionally, in some embodiments of the present disclosure, the data writing module comprises a switch transistor and a storage capacitor.

The gate of the switch transistor is connected to the scan signal. A first electrode of the switch transistor is connected to the data signal. A second electrode of the switch transistor, one end of the storage capacitor, and the gate of the drive transistor are electrically connected. The other end of the storage capacitor is electrically connected to first electrode of the drive transistor.

The present disclosure also provides a display panel. The display panel comprises a plurality of pixel units arranged in an array, each of which comprises a light-emitting driving circuit.

The light-emitting driving circuit includes a drive transistor, a data writing module, and a light-emitting module. A first electrode of the drive transistor is electrically connected to a first node, and a second electrode of the drive transistor is electrically connected to a first power signal. The data writing module is fed to a scan signal and a data signal, and is electrically connected to a gate of the drive transistor. The data writing module is configured to write the data signal to the gate of the drive transistor under a control of the scan signal. The light-emitting module includes at least one of the first light-emitting devices and at least one of the second light-emitting devices. A first terminal of the first light-emitting device and a second terminal of the second light-emitting device are both electrically connected to the first node. The second terminal of the first light-emitting device and the first terminal of the second light-emitting device are fed with a second power signal. The first power signal and the second power signal are configured to perform level conversion according to a preset period, so that a direction of a current flowing through the drive transistor is changed according to the preset period.

Optionally, in some embodiments of the present disclosure, the length of the preset period is at least one frame.

Optionally, in some embodiments of the present disclosure, the first power signal and the second power signal are configured to perform level conversion in a vertical blanking time between adjacent frames.

Optionally, in some embodiments of the present disclosure, the first power signal has a first high voltage level and a first low voltage level, and the first power signal is switched between the first high voltage level and the first low voltage level according to the preset period.

The second power signal has a second high voltage level and a second low voltage level, and the second power signal is switched between the second high voltage level and the second low voltage level according to the preset period.

Optionally, in some embodiments of the present disclosure, the first high voltage level and the second high voltage level are the same, the first low voltage level and the second low voltage level are the same, and the first power signal and the second power signal are kept in antiphase.

Optionally, in some embodiments of the present disclosure, the data writing module includes a switch transistor and a storage capacitor.

The gate of the switch transistor is connected to the scan signal. A first electrode of the switch transistor is connected to the data signal. A second electrode of the switch transistor, one end of the storage capacitor, and the gate of the drive transistor are electrically connected. The other end of the storage capacitor is electrically connected to first electrode of the drive transistor.

The present disclosure provides a light-emitting driving circuit, a backlight module, and a display panel. The light-emitting driving circuit includes a drive transistor, a data writing module, and a light-emitting module. The source and drain of the drive transistor are electrically connected to a first power signal and a first node, respectively. The light-emitting module includes at least one of the first light-emitting devices and at least one of the second light-emitting devices. Both the first terminal of the first light-emitting device and the second terminal of the second light-emitting device are electrically connected to the first node. Bothe the second terminal of the first light-emitting device and the first terminal of the second light-emitting device are electrically connected to a second power signal. The present disclosure configures the first power signal and the second power signal are configured to perform level conversion according to a preset period, so that the direction of the current flowing through the drive transistor is changed according to the preset period, thereby effectively improving the current bias of the drive transistor, avoiding the threshold voltage and mobility drift of the drive transistor, improving the stability of the drive transistor. In addition, since the first light-emitting device and the second light-emitting device are arranged in reverse directions, which can alternately emit light under the operation of the driving current, thereby achieving the purpose of reducing light efficiency and reducing dead pixels.

DETAILED DESCRIPTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments of this application, other embodiments derived by those skilled in the art without creative work shall fall within the protection scope of this application.

In addition, the terms "first", "second", etc. in the specification and claims of the present disclosure are used to distinguish different objects, rather than to describe a specific order. The terms "including" and "comprising" and any variations of them are intended to cover non-exclusive inclusion.

The present disclosure provides a light-emitting driving circuit, a backlight module, and a display panel, which will be described in detail below. It should be noted that the description order of the following embodiments is not intended to limit the preferred order of the embodiments of the present disclosure.

Figure 1:
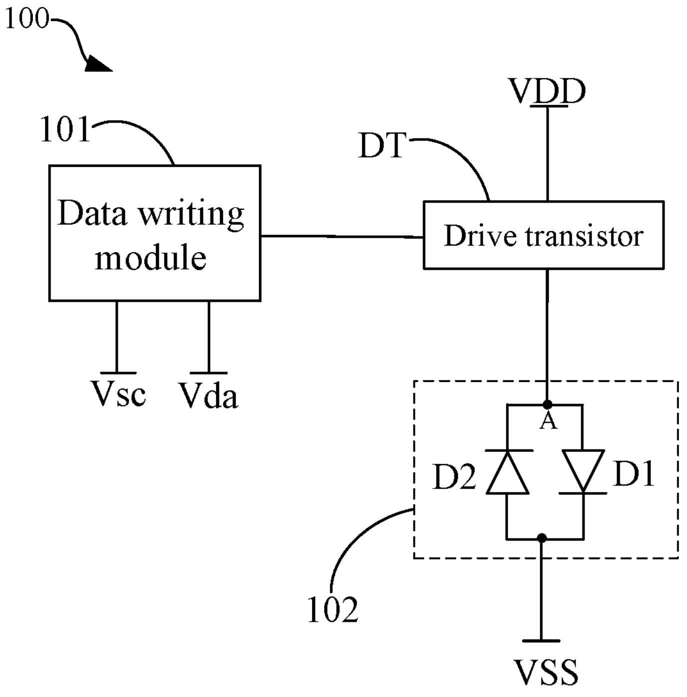
FIG. 1 is a first structural schematic diagram of a light-emitting driving circuit provided by the present disclosure.

Please refer to FIG. 1. FIG. 1 is the first structural schematic diagram of a light-emitting driving circuit provided by the present disclosure. In the present disclosure, the light-emitting driving circuit 100 includes a drive transistor DT, a data writing module 101 and a light-emitting module 102.

The first electrode of the drive transistor DT is electrically connected to the first node A. The second electrode of the drive transistor DT is electrically connected to the first power signal VDD. The data writing module 101 is connected to the scan signal Vsc and the data signal Vda, and is electrically connected to the gate of the drive transistor DT. The data writing module 101 is used to write the data signal Vda to the gate of the drive transistor DT under the control of the scan signal Vsc. The light-emitting module 102 includes at least one of the first light-emitting devices D1 and at least one of the second light-emitting devices D2. The first terminal of the first light-emitting device D1 and the second terminal of the second light-emitting device D2 are both electrically connected to the first node A. The second terminal of the first light-emitting device D1 and the first terminal of the second light-emitting device D2 are both electrically connected to the second power signal VSS. The first power signal VDD and the second power signal VSS are configured to perform level conversion according to a preset period, so that the direction of current flowing through the drive transistor DT is changed according to the preset period.

In the light-emitting driving circuit 100 of the present disclosure, since the first terminal of the first light-emitting device D1 and the second terminal of the second light-emitting device D2 are both electrically connected to the first node A, the second terminal of the first light-emitting device D1 and the first terminals of the second light-emitting device D2 are all electrically connected to the second power signal VSS. That is, the first light-emitting device D1 and the second light-emitting device D2 are arranged in reverse directions. Therefore, the first light-emitting device D1 and the second light-emitting device D2 do not emit light at the same time. Then, by converting the first power signal VDD and the second power signal VSS according to the preset period, the direction of the current flowing through the drive transistor DT can be changed according to the preset period, thereby effectively improving the current bias of the drive transistor DT, avoiding the threshold voltage and mobility drift of the drive transistor DT, improving the stability of the drive transistor DT. At the same time, when the direction of the driving current changes, the first light-emitting device D1 and the second light-emitting device D2 can alternately emit light to avoid abnormal light emission caused by the change of the direction of the driving current.

In addition, since the first light-emitting device D1 and the second light-emitting device D2 emit light alternately, the temperature of the first light-emitting device D1 and the second light-emitting device D2 will not be too high, thereby reducing the light efficiency. The current bias effect of the first light-emitting device D1 and the second light-emitting device D2 can also be suppressed. Furthermore, since each light-emitting module 102 has a first light-emitting device D1 and a second light-emitting device D2, when any one of them is damaged, the other one can continue to provide brightness, thereby reducing the impact of dead pixels.

The first light-emitting device D1 and the second light-emitting device D2 can be mini light-emitting diodes, micro light-emitting diodes or organic light-emitting diodes. When the first light-emitting device D1 and the second light-emitting device D2 are the above-mentioned light-emitting diodes. The first terminal of the first light-emitting device D1 may be one of the positive terminal or the negative terminal of the light-emitting diode. The second terminal of the first light-emitting device D1 may be the other one of the positive terminal or the negative terminal of the light-emitting diode. The same is true for the second light-emitting device D2, which will not be repeated here.

In this application, the length of the preset period is at least one frame. One frame represents the time for the display panel to display one frame. For example, the preset period can be 1 frame, 2 frames, 5 frames, 10 frames, etc., which can be specifically set according to specific parameters of the light-emitting driving circuit 100, hence is not limited in this application. Wherein, the first power signal VDD and the second power signal VSS can be provided by an external power chip (not shown in the figure), which is not addressed here. Further, the first power signal VDD and the second power signal VSS can be converted in level during the vertical blanking time between the current frame and the next adjacent frame, so as to avoid affecting the display screen of the display panel.

In this application, the voltage value of the first power signal VDD and the voltage value of the second power signal VSS can be set according to actual applications. It only needs to satisfy that the first light-emitting device D1 and the second light-emitting device D2 can alternately emit light under the operation of the voltage value of the first power signal VDD and the second power signal VSS. For example, when the voltage value of the first power signal VDD is greater than the second power signal VSS, the first light-emitting device D1 emits light, and the driving current flows from the first power signal VDD to the second power signal VSS. When the voltage value of the first power signal VDD is less than the second power signal VSS, the second light-emitting device D2 emits light, and the driving current flows from the second power signal VSS to the first power signal VDD.

Figure 2:
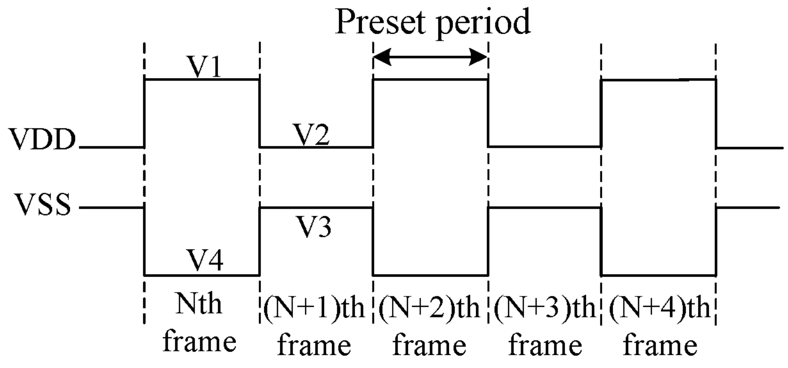
FIG. 2 is a timing diagram of the first power signal and the second power signal in the light-emitting driving circuit provided by the present disclosure.

Specifically, please refer to FIG. 2, which is a timing diagram of the first power signal and the second power signal in the light-emitting driving circuit provided by the present disclosure. In some embodiments of the present disclosure, the first power signal VDD has a first high voltage level V1 and a first low voltage level V2. The first power signal VDD is switched between the first high voltage level V1 and the first low voltage level V2 according to a preset period. The second power signal VSS has a second high voltage level V3 and a second low voltage level V4. The second power signal VSS is switched between the second high voltage level V3 and the second low voltage level V4 according to a preset period.

Wherein, the first high voltage level V1 and the second high voltage level V3 can be any high voltage level that can drive the first light-emitting device D1 and the second light-emitting device D2 to emit light steadily. The levels of the first low voltage level V2 and the second low voltage level V4 can be the levels of the ground terminal. Of course, it is understandable that the levels of the first low voltage level V2 and the second low voltage level V4 may also be other low voltage levels that drive the first light-emitting device D1 and the second light-emitting device D2 to emit light steadily.

In some embodiments of the present disclosure, the first high voltage level V1 and the second high voltage level V3 are the same. The first low voltage level V2 and the second low voltage level V4 are the same. That is, the first power supply signal VDD and the second power supply signal VSS are kept in antiphase at all times. Wherein, keeping the antiphase means that the absolute value of the voltage of the first power signal VDD and the absolute value of the voltage of the second power signal VSS are equal, but the phases are opposite. Therefore, the timing in the light-emitting driving circuit 100 can be simplified, and the power consumption of the power chip that provides the first power signal VDD and the second power signal VSS can be reduced.

Figure 3:
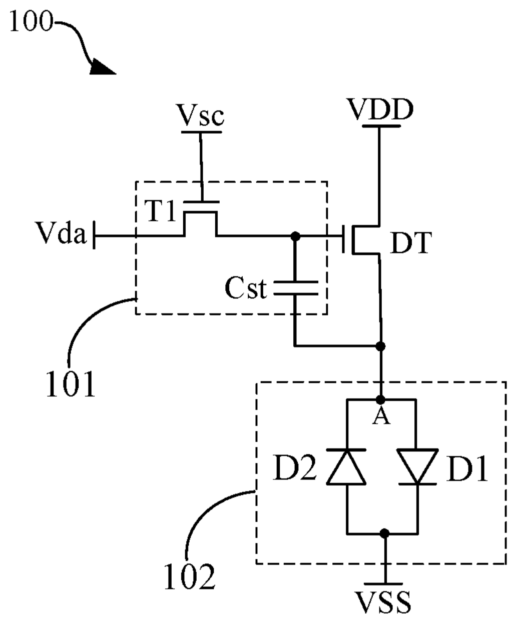
FIG. 3 is a schematic diagram of the first circuit of the light-emitting driving circuit provided by the present disclosure.

Please refer to FIG. 3, which is the first circuit diagram of the light-emitting driving circuit provided by the present disclosure. In some embodiments of the present disclosure, the data writing module 101 includes a switch transistor T1 and a storage capacitor Cst. The gate of the switch transistor T1 is connected to the scan signal Vsc. The first electrode of the switch transistor T1 is connected to the data signal Vda. The second electrode of the switch transistor T1, one end of the storage capacitor Cst, and the gate of the drive transistor DT are electrically connected. The other end of the storage capacitor Cst is electrically connected to the first electrode of the drive transistor DT. Of course, it is understandable that the data writing module 101 can also be formed by using multiple transistors and a capacitor in series.

The transistors used in all the embodiments of this application can be thin film transistors or field effect transistors or other devices with the same characteristics. Since the source and drain of the transistors used here are symmetrical, the source and drain can be interchangeable. In the embodiments of the present disclosure, in order to distinguish the two electrodes of the transistor except the gate, the first electrode is called the source and the second electrode is called the drain, or the first electrode is called the drain and the second electrode is called the source. According to the structure of the figure, the middle end of the switch transistor is the gate, the signal input end is the source, and the signal output end is the drain. In addition, the transistors used in the embodiments of the present disclosure may include P-type transistors and/or N-type transistors. The P-type transistor is turned on when the gate is at a low voltage level and turned off when the gate is at a high voltage level, and the N-type transistor is turned on when the gate is at a high voltage level and is turned off when the gate is at a low voltage level.

Further, the transistors in the light-emitting driving circuit 100 provided in the present disclosure can be set to be the same type of transistors, so as to avoid the influence of the discrepancies between different types of transistors on the light-emitting driving circuit 100. The following embodiments of the present disclosure are described by taking each transistor as an N-type transistor as an example, but it should not be construed as a limitation of the present disclosure.

Specifically, the switch transistor T1 is turned on when the scan signal Vsc is changed from a low voltage level to a high voltage level, and the data signal Vda is transmitted to the gate of the drive transistor DT through the switch transistor T1 and stored in the storage capacitor Cst. Since the gate level of the drive transistor DT is pulled up to the level of the data signal Vda, the drive transistor DT is turned on. At the same time, when the level of the first power signal VDD is higher than the level of the second power signal VSS, the first power signal VDD, the drive transistor DT, the first light-emitting device D1, and the second power signal VSS form a light-emitting loop. The current flows from the first power signal VDD to the second power signal VSS and the first light-emitting device D1 normally emits light. Conversely, when the level of the first power signal VDD is less than the second power signal VSS, the first power signal VDD, the drive transistor DT, the second light-emitting device D2, and the second power signal VSS form a light-emitting loop. The current flows from the second power signal VSS to the first power signal VDD and the second light-emitting device D2 normally emits light.

Figure 4:
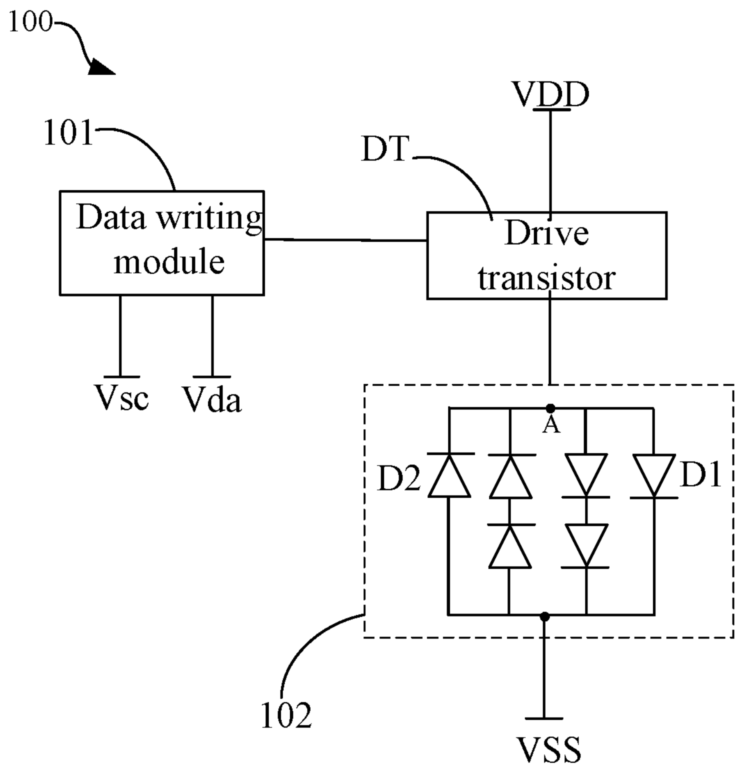
FIG. 4 is a schematic diagram of the second structure of the light-emitting driving circuit provided by the present disclosure.

Please refer to FIG. 4. FIG. 4 is a second structural diagram of the light-emitting driving circuit provided by the present disclosure. The difference from the light-emitting driving circuit 100 shown in FIG. 1 is that, in this embodiment, the light-emitting module 102 includes a plurality of first light-emitting devices D1 and a plurality of light-emitting devices D2. Wherein, the first terminal and the second terminal of the plurality of first light-emitting devices D1 are arranged in the same direction. The plurality of first light-emitting devices D1 can be arranged in series or in parallel. In the same way, the first terminal and the second terminal of the plurality of second light-emitting devices D2 are arranged in the same direction. The plurality of second light-emitting devices D2 can be arranged in series or in parallel. FIG. 4 is only an example and cannot be construed as a limitation of the present disclosure.

In this embodiment, multiple first light-emitting devices D1 and multiple light-emitting devices D2 are provided in the light-emitting module 102, and multiple first light-emitting devices D1 can be arranged in series or in parallel, and multiple second light-emitting devices D2 can be arranged in series or in parallel, which can improve the luminous brightness. And when one of the light-emitting devices fails, the other light-emitting devices can also provide sufficient brightness to further reduce the influence of dead pixels and increase the service life of the light-emitting driving circuit 100.

Figure 5:
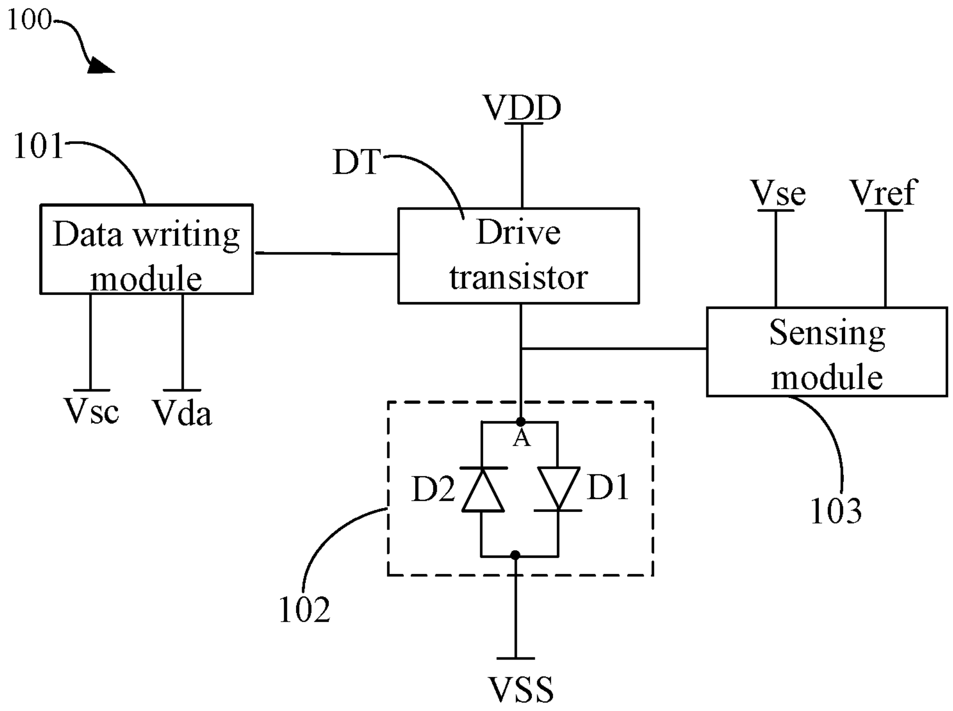
FIG. 5 is a schematic diagram of the third structural of the light-emitting driving circuit provided by the present disclosure.

Please refer to FIG. 5. FIG. 5 is a third structural diagram of the light-emitting driving circuit provided by the present disclosure. The difference from the light-emitting driving circuit 100 shown in FIG. 1 is that, in this embodiment, the light-emitting driving circuit 100 further includes a sensing module 103. The sensing module 103 is connected to the sensing signal Vse and the reset signal Vref, and is electrically connected to the first electrode of the drive transistor DT. The sensing module 103 is used for detecting the threshold voltage of the drive transistor DT under the control of the sensing signal Vse and the reset signal Vref.

Figure 6:
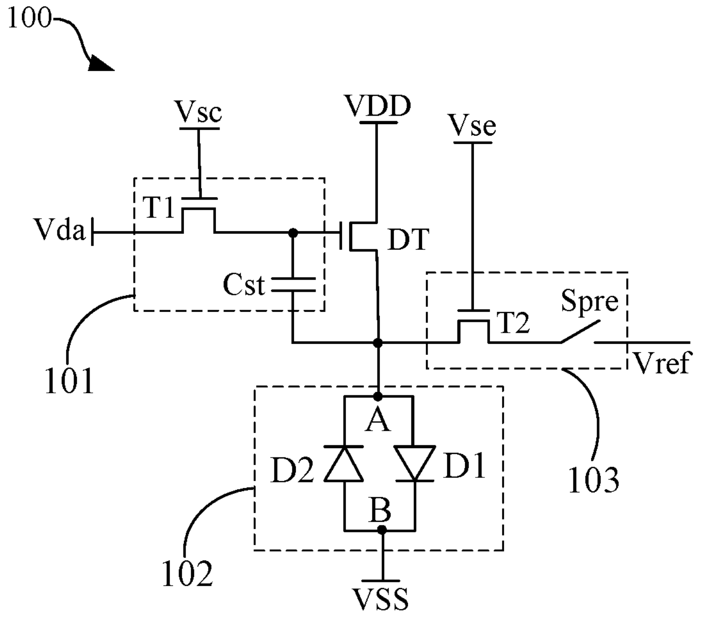
FIG. 6 is a schematic diagram of a second circuit of the light-emitting driving circuit provided by the present disclosure.

Specifically, please refer to FIG. 6. FIG. 6 is a schematic diagram of a second circuit of the light-emitting driving circuit provided in the present disclosure. In some embodiments of the present disclosure, the sensing module 103 includes a sensing transistor T2 and a first switch unit Spre. The gate of the sensing transistor T2 is connected to the sensing signal Vse. The first electrode of the sensing transistor T2 is electrically connected to one end of the first switch unit Spre. The second electrode of the sensing transistor T2 is electrically connected to first electrode of the drive transistor DT. The other end of the first switch unit Spre is connected to the reset signal Vref.

The driving timing of the light-emitting driving circuit 100 in this embodiment includes a sensing phase and a light-emitting phase.

In the sensing phase, the scan signal Vsc changes from a low voltage level to a high voltage level, and the switch transistor T1 is turned on. The data signal Vda is transmitted to the gate of the drive transistor DT through the switch transistor T1 and is stored in the storage capacitor Cst. At the same time, the sensing signal Vse is at a high voltage level, and the sensing transistor T2 is turned on, the first switch unit Spre is closed. The reset signal Vref is transmitted to the first electrode of the drive transistor DT, so that the voltage of the first electrode of the drive transistor DT is equal to the reset signal Vref. Then, the scan signal Vsc changes from a high voltage level to a low voltage level, and the switch transistor T1 is cut off, so that the gate of the drive transistor DT is in a floating state. The sensing transistor keeps T2 turned on, and the first switching element Spre is cut off. The voltage of the first electrode of the drive transistor DT rises. When the voltage of one of the source or drain of the drive transistor DT rises until the drive transistor DT is turned off, an external detection source ADC (Analog To Digital Converter) can be used to detect the level of the first electrode of the drive transistor DT, so as to obtain the initial threshold voltage of the drive transistor DT.

In the light-emitting phase, the scan signal Vsc changes from a low voltage level to a high voltage level, the switch transistor T1 is turned on. The data signal Vda is transmitted to the gate of the drive transistor DT through the switch transistor T1 and is stored in the storage capacitor Cst. At the same time, the sensing signal is at a low voltage level, and the sensing transistor T2 is turned off. Since the gate level of the drive transistor DT is pulled up to the level of the data signal Vda, the drive transistor DT is turned on. At the same time, the first light-emitting device D1 or the second light-emitting device D2 emits light, which will not to be repeated here. Among them, the data signal Vda is a signal that has been compensated with a threshold voltage.

In this embodiment, by adding the sensing module 103 to the light-emitting driving circuit 100, the threshold voltage of the drive transistor DT can be detected, thereby realizing a compensation for the threshold voltage drift of the drive transistor DT, and further improving the stability of the drive transistor DT.

It should be noted that the light-emitting driving circuit 100 provided in the present disclosure is only an example, and those skilled in the art can configure the light-emitting driving circuit 100 according to a specific need. That is, the light-emitting driving circuit 100 provided by the embodiment of the present disclosure does not only include the above-described devices. The light-emitting driving circuit 100 provided by the embodiment of the present disclosure may further include other devices. For example, in order to further improve the control of the light-emitting time period of the light-emitting module 102, a transistor can be added between the first power signal VDD and the drive transistor DT, and/or a transistor can be added between the light-emitting module 102 and the second power signal VSS, so as to control the light-emitting time period of the light-emitting module 102. For another example, the light-emitting driving circuit 100 may further include an internal compensation circuit to internally compensate the threshold voltage of the drive transistor DT. Compared with the external detection of the sensing module 103, the internal detection is more convenient.

Figure 7:
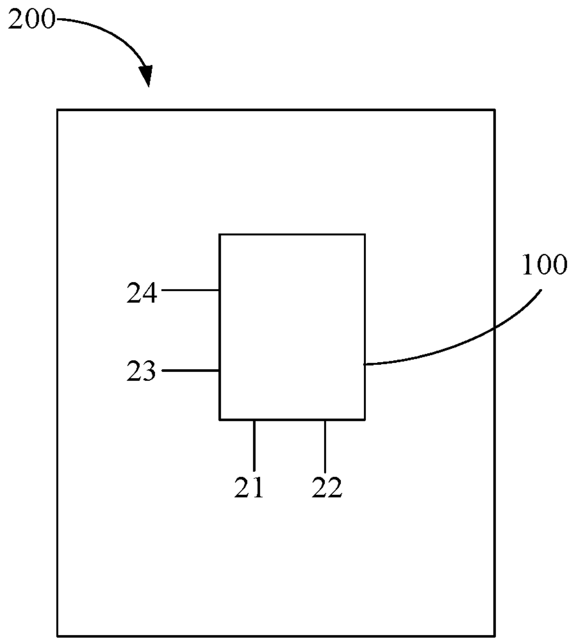
FIG. 7 is a schematic diagram of a structure of the backlight module provided by the present disclosure.

Please refer to FIG. 7. FIG. 7 is a schematic structural diagram of a backlight module provided by an embodiment of the application. An embodiment of the present disclosure also provides a backlight module 200, which includes a scan line 21, a data line 22, a first power line 23, a second power line 24, and a light-emitting driving circuit 100 described in any of the above embodiments. Among them, the scan line 21 is used to provide a scan signal, the data line 22 is used to provide a data signal, the first power line 23 is used to provide a first power signal, and the second power line 24 is used to provide a second power signal. The light-emitting driving circuit 100 is electrically connected to the scan line 21, the data line 22, the first power line 23, and the second power line 24, respectively. For details of the light-emitting driving circuit 100, refer to the above description of the light-emitting driving circuit, which will not be repeated here.

In the backlight module 200 of the present disclosure, a new type of light-emitting driving circuit 100 is designed. The first power signal and the second power signal are configured to perform level conversion according to a preset period, so that the first light-emitting device and the second light-emitting device emit light alternately. That is, the direction of the current flowing through the drive transistor is changed according to the preset period. Therefore, the current bias of the drive transistor can be effectively improved, the stability of the drive transistor can be improved, such that the backlight module 200 can provide a stable light source.

Figure 8:
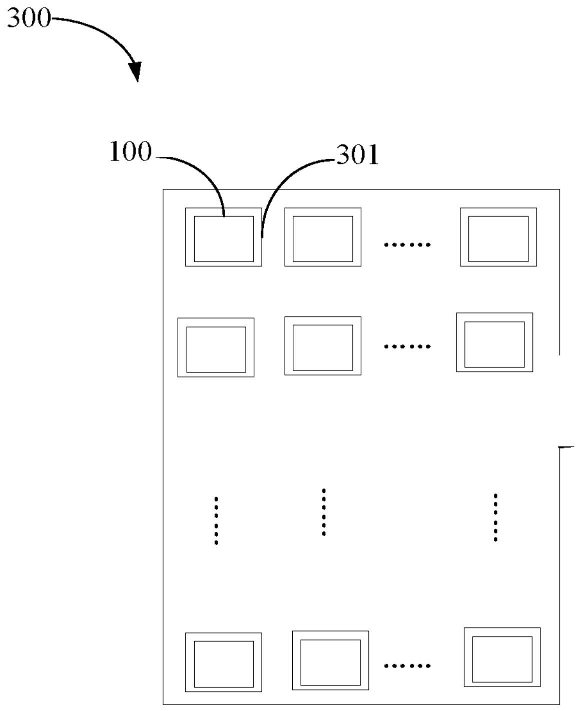
FIG. 8 is a schematic diagram of a structure of the display panel provided by the present disclosure.

Please refer to FIG. 8. FIG. 8 is a schematic structural diagram of a display panel provided by an embodiment of the application. The embodiment of the present disclosure provides a display panel 300. The display panel 300 includes a plurality of pixel units 301 arranged in an array. Each pixel unit 301 includes the above-mentioned light-emitting driving circuit 100. For details, please refer to the above description of the light-emitting driving circuit 100, which will not be repeated here.

The display panel 300 may be a mini light-emitting diode (Mini LED) display panel, a micro light-emitting diode (Micro LED) display panel, or an organic light-emitting diode (OLED) display panel.

In the display panel 300 of the present disclosure, a new type of light-emitting driving circuit 100 is designed for the pixel unit 301. The first power signal and the second power signal are configured to perform level conversion according to a preset period, so that the direction of the current flowing through the drive transistor circuit is changed according to the preset period. In this way, the current bias of the drive transistor can be effectively improved, and the stability of the drive transistor can be improved. In turn, the display panel 300 is uniformly displayed and the quality of the display panel 300 can be improved. In addition, the first light-emitting device and the second light-emitting device alternately emit light, which can reduce the influence of dead pixels and improve the quality of the display panel 300.

The embodiments of the present disclosure are described in detail above. Specific examples are used in this article to describe the principles and implementations of the application. The descriptions of the above examples are only used to help understand the methods and core ideas of the application, which do not limit the patent scope of the application. Any equivalent structure or equivalent process transformations derived from the contents of the descriptions and drawings of this application, or directly or indirectly applied in other related technical fields, are similarly included in the patent protection scopes of this application.

What is claimed is:

1. A light-emitting driving circuit, comprising:

a drive transistor, having a first electrode electrically connected to a first node, and a second electrode fed with a first power signal;

a data writing module, fed to a scan signal and a data signal, electrically connected to a gate of the drive transistor, and configured to write the data signal to the gate of the drive transistor under a control of the scan signal; and a light-emitting module, including a plurality of first light emitting devices and a plurality of second light emitting devices, wherein a portion of the plurality of the first emitting devices are connected in series and at least one of the plurality of the first emitting devices are connected in parallel with the series-connected portion of the plurality of the first emitting devices; a portion of the plurality of the second emitting devices are connected in series and at least one of the plurality of the second emitting devices are connected in parallel with the series-connected portion of the plurality of the first emitting devices; and an anode of the at least one first light-emitting device and a cathode of the at least one second light-emitting device are both electrically connected to the first node, and the cathode of the at least one first light-emitting device and the anode of the at least one second light-emitting device are fed with a second power signal;

wherein the first power signal and the second power signal are configured to perform level conversion according to a preset period, so that a direction of a current flowing through the drive transistor is changed according to the preset period.

2. The light-emitting driving circuit of claim 1, wherein the length of the preset period is at least one frame.

3. The light-emitting driving circuit of claim 2, wherein the first power signal and the second power signal are configured to perform level conversion in a vertical blanking time between adjacent frames.

4. The light-emitting driving circuit of claim 1, wherein the first power signal has a first high voltage level and a first low voltage level, and the first power signal is switched between the first high voltage level and the first low voltage level according to the preset period; wherein the second power signal has a second high voltage level and a second low voltage level, and the second power signal is switched between the second high voltage level and the second low voltage level according to the preset period.

5. The light-emitting driving circuit of claim 4, wherein the first high voltage level and the second high voltage level are the same, the first low voltage level and the second low voltage level are the same, and the first power signal and the second power signal are kept in antiphase.

6. The light-emitting driving circuit of claim 1, wherein the data writing module includes a switch transistor and a storage capacitor; the gate of the switch transistor is connected to the scan signal; a first electrode of the switch transistor is connected to the data signal; a second electrode of the switch transistor, one end of the storage capacitor, and the gate of the drive transistor are electrically connected; and the other end of the storage capacitor is electrically connected to first electrode of the drive transistor.

7. The light-emitting driving circuit of claim 1, wherein the light-emitting driving circuit further comprises:

a sensing module, electrically connected to the first electrode of the drive transistor, and configured to detect a threshold voltage of the drive transistor under a control of a sensing signal and a reset signal.

8. The light-emitting driving circuit of claim 7, wherein the sensing module comprises a sensing transistor and a first switch unit; the gate of the sensing transistor is connected to the sensing signal; a first electrode of the sensing transistor is electrically connected to one end of the first switch unit; a second electrode of the sensing transistor is electrically connected to a first electrode of the drive transistor; and the other end of the first switch unit is connected to the reset signal.

9. A backlight module device, comprising:

a data line, configured to provide a data signal;

a scan lines, configured to provide a scan signal;

a first power line, configured to provide a first power signal;

a second power line, configured to provide a second power signal; and a light-emitting driving circuit, electrically connected to the data line, the scan line, the first power line, and the second power line, wherein the light-emitting driving circuit comprises:

a drive transistor, having a first electrode electrically connected to a first node, and a second electrode fed with a first power signal;

a data writing module, electrically connected to a gate of the drive transistor, and configured to write the data signal to the gate of the drive transistor under a control of the scan signal; and a light-emitting module, including a plurality of first light emitting devices and a plurality of second light emitting devices, wherein a portion of the plurality of the first emitting devices are connected in series and at least one of the plurality of the first emitting devices are connected in parallel with the series-connected portion of the plurality of the first emitting devices; a portion of the plurality of the second emitting devices are connected in series and at least one of the plurality of the second emitting devices are connected in parallel with the series-connected portion of the plurality of the first emitting devices; and an anode of the at least one first light-emitting device and a cathode of the at least one second light-emitting device are both electrically connected to the first node, and the cathode of the at least one first light-emitting device and the anode of the at least one second light-emitting device are fed with a second power signal;

wherein, the first power signal and the second power signal are configured to perform level conversion according to a preset period, so that the direction of the current flowing through the drive transistor is changed according to the preset period.

10. The backlight module device of claim 9, wherein a length of the preset period is at least one frame.

11. The backlight module device of claim 10, wherein the first power signal and the second power signal are configured to perform level conversion in a vertical blanking time between adjacent frames.

12. The backlight module device of claim 9, wherein the first power signal has a first high voltage level and a first low voltage level, and the first power signal is switched between the first high voltage level and the first low voltage level according to the preset period; wherein the second power signal has a second high voltage level and a second low voltage level, and the second power signal is switched between the second high voltage level and the second low voltage level according to the preset period.

13. The backlight module device of claim 12, wherein the first high voltage level and the second high voltage level are the same, the first low voltage level and the second low voltage level are the same, and the first power signal and the second power signal are kept in antiphase.

14. The backlight module device of claim 9, wherein the data writing module comprises a switching transistor and a storage capacitor; the gate of the switch transistor is connected to the scan signal; a first electrode of the switch transistor is connected to the data signal; a second electrode of the switch transistor, one end of the storage capacitor, and the gate of the drive transistor are electrically connected; and the other end of the storage capacitor is electrically connected to first electrode of the drive transistor.

15. A display panel device, comprising a plurality of pixel units arranged in an array, each of the pixel units comprising a light-emitting driving circuit, the light-emitting driving circuit comprising:

a drive transistor, having a first electrode electrically connected to a first node, and a second electrode fed with a first power signal;

a data writing module, fed to a scan signal and a data signal, electrically connected to a gate of the drive transistor, and configured to write the data signal to the gate of the drive transistor under a control of the scan signal; and a light-emitting module, including a plurality of first light emitting devices and a plurality of second light emitting devices, wherein a portion of the plurality of the first emitting devices are connected in series and at least one of the plurality of the first emitting devices are connected in parallel with the series-connected portion of the plurality of the first emitting devices; a portion of the plurality of the second emitting devices are connected in series and at least one of the plurality of the second emitting devices are connected in parallel with the series-connected portion of the plurality of the first emitting devices; and an anode of the at least one first light-emitting device and a cathode of the at least one second light-emitting device are both electrically connected to the first node, and the cathode of the at least one first light-emitting device and the anode of the at least one second light-emitting device are fed with a second power signal;

wherein the first power signal and the second power signal are configured to perform level conversion according to a preset period, so that a direction of a current flowing through the drive transistor is changed according to the preset period.

16. The display panel device of claim 15, wherein a length of the preset period is at least one frame.

17. The display panel device of claim 16, wherein the first power signal and the second power signal are configured to perform level conversion in a vertical blanking time between adjacent frames.

18. The display panel device of claim 15, wherein the first power signal has a first high voltage level and a first low voltage level, and the first power signal is switched between the first high voltage level and the first low voltage level according to the preset period; wherein the second power signal has a second high voltage level and a second low voltage level, and the second power signal is switched between the second high voltage level and the second low voltage level according to the preset period.

19. The display panel device of claim 18, wherein the first high voltage level and the second high voltage level are the same, the first low voltage level and the second low voltage level are the same, and the first the power signal and the second power signal are kept in antiphase.

20. The display panel device of claim 15, wherein the data writing module comprises a switching transistor and a storage capacitor; the gate of the switch transistor is connected to the scan signal; a first electrode of the switch transistor is connected to the data signal; a second electrode of the switch transistor, one end of the storage capacitor, and the gate of the drive transistor are electrically connected; and the other end of the storage capacitor is electrically connected to first electrode of the drive transistor.

* * * * *